Figure 1:
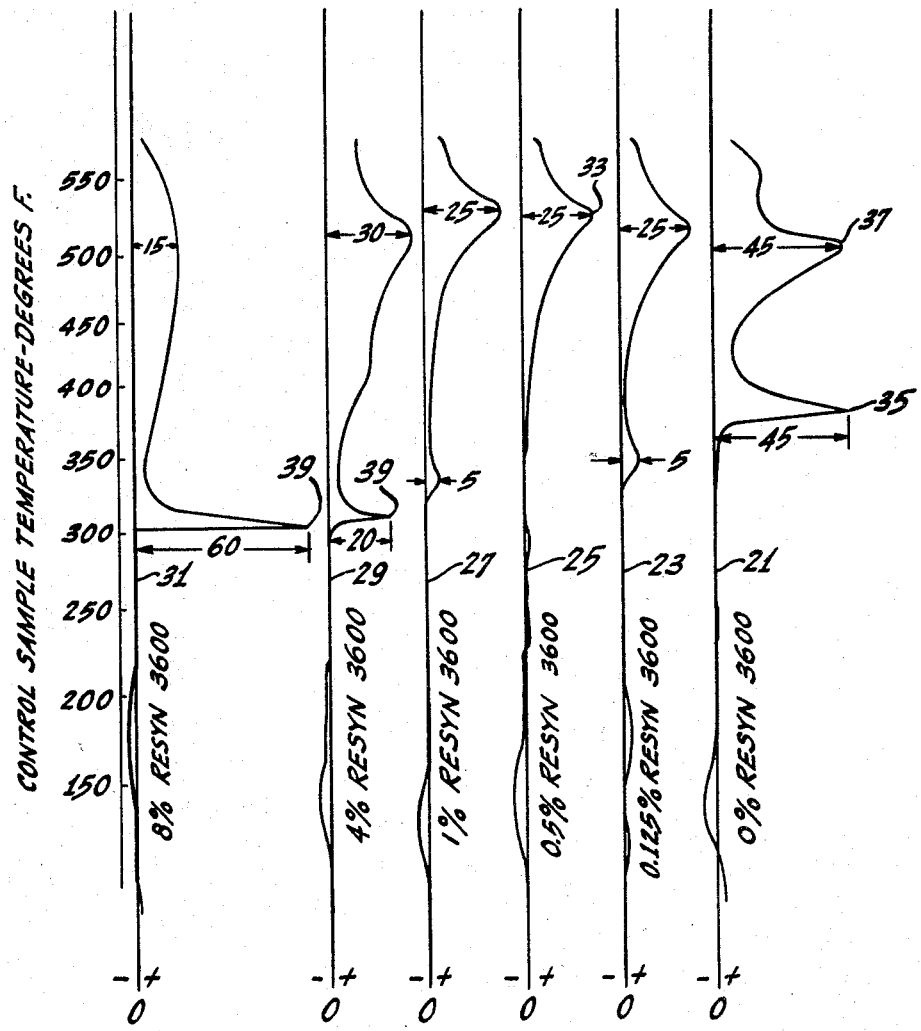

United States Patent Office 3,178,369
Patented Apr. 13, 1965

3,178,369
METHOD FOR PREPARING FERRITE CORE
John O. Simpkiss, Jr., Indianapolis, Ind., assignor to Radio Corporation of America, a corporation of Delaware
Filed Mar. 22, 1962, Ser. No. 181,765
5 Claims. (Cl. 252—62.5)

This invention relates to an improved green ferrite composition and a body thereof and to an improved method for preparing a sintered ferrite core.

Ferrite cores are polycrystalline ferri-magnetic bodies of sintered crystallites which are characterized by either a cubic or a hexagonal crystal structure. See, for example, U.S. Patents Nos. 2,723,238, 2,723,239, 2,762,776, 2,762,777 and 2,762,778.

One method for preparing a ferrite core comprises intimately mixing ferric oxide and one or more other metal oxides such as zinc oxide and manganese oxide. A binder-lubricant is added to the mixture and then the mixture is ground or comminuted to provide a uniform distribution. The binder-lubricant addition may be one or more of a wax, a starch, or a metal stearate. Subsequently, the comminuted mixture, which is referred to herein as the green ferrite composition, is pelletized, dried, and then shaped or molded, as by pressing, to form the green ferrite body. The binder-lubricant facilitates the molding step and imparts mechanical strength to the green ferrite body.

The green ferrite body is then subjected to a low temperature (about 400° to 500° F.) heat treatment in air, referred to as dewaxing, to remove the binder-lubricant and other volatile matter. Following dewaxing, the body is subjected to a high temperature (about 1800° to 2600° F.) heat treatment, referred to as sintering, to react the metal oxides so as to produce ferrite crystallites, to sinter the crystallites to a unitary body or core, and to impart the desired ferrimagnetic properties to the sintered core.

Ordinarily, the binder-lubricant is comprised of materials which volatilize over different temperature ranges during dewaxing to form gaseous products which burn upon contact with the air. Where the dewaxing is carried out in air, this burning raises the temperature of the body to one or more temperature peaks, referred to as exothermic temperature peaks. Each of these temperature rises and falls is generally sharp and results from the volatilization and burning of a particular constituent of the binder-lubricant. Strains develop in the body as a result of these temperature fluctuations. Additionally, strains develop in the body as a result of non-uniform temperature distribution in the body. In many cases, the green ferrite body cracks or shatters as a result of strain.

An object of this invention is to provide a method for preparing ferrite cores in which the exothermic temperature peaks during dewaxing are suppressed, thereby reducing cracking and shattering of the body.

A more general object is to provide an improved method for preparing sintered ferrite cores.

Another object is to provide an improved green ferrite composition.

A further object is to provide an improved green ferrite body.

In general, the method of the invention is similar to that of the prior art method described above, except that about 0.1 to 4.0 weight percent of an exothermic peak suppressor is added to the green ferrite composition. The exothermic peak suppressor may be a vinylidene chloride copolymer, such as vinylidene chloride-acrylate copolymer. The suppressor may be more generally defined as a material which, before volatilizing, decomposes at temperatures between about 200° and 500° F. to form predominantly gaseous products which do not burn upon contact with air. It has been found that during dewaxing, due to the preseence of the suppressor in the green ferrite body, the exothermic temperature peaks are either reduced or eliminated, and cracking and shattering of the body is markedly reduced.

Figure 2:
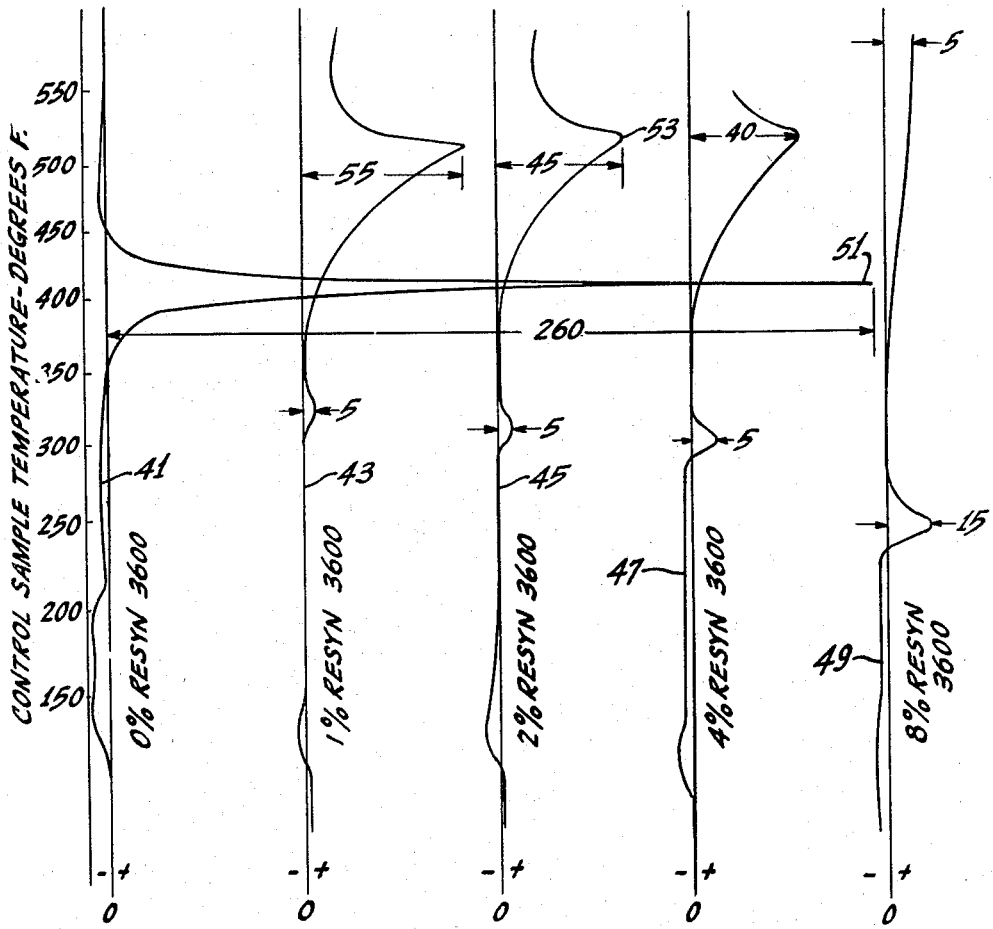

The invention is described in more detail in the following description with reference to the drawings in which:

FIGURE 1 is a family of differential temperature curves showing the temperature differential between a dewaxed control sample and undewaxed samples containing varying amounts of an exothermic peak suppressor for one ferrite formulation, and FIGURE 2 is another family of differential temperature curves for another ferrite formulation.

*Example 1.*—Compound a raw batch of metal oxides in the following proportions: 68.6 weight percent $Fe_2O_3$, 19.6 weight percent $MnO_2$, 9.82 weight percent $ZnO$, and 1.96 weight percent $CuO$. Attrite the raw batch in water for about two hours to completely mix the oxides and to produce the desired particle size distribution. Filter and dry the attrited batch and then granulate the dry batch to pass through a 10 mesh screen. Comminute the granulated batch with 4 weight percent paraffin wax as a water-base emulsion containing 50% solids, 0.5 weight percent of zinc stearate, and 0.5 weight percent starch, and 0.5 weight percent vinylidene chloride-acrylate copolymer as an aqueous suspension containing 50% solids, to form the green ferrite composition. All weight percentages are with respect to the total metal oxides content of the raw batch. After thorough mixing, the green ferrite composition is pelletized and then pressed, molded, or otherwise formed to a desired shape to produce the green ferrite body.

The green ferrite body is now placed in a furnace or kiln and heated in air. The temperature of the kiln is raised uniformly to about 480° F., where it is held for about one hour. This is the dewaxing step during which the volatile matter in the green ferrite body is removed. The dewaxing step is followed by the sintering step in which the body is heated to a sintering temperature of about 2525° F. in an atmosphere of nitrogen containing 0.1 to 0.5 percent by volume of oxygen. Finally, the sintered body is cooled to room temperature. The product is a sintered ferrite core having the desired magnetic properties.

FIGURE 1 is a family of differential temperature curves 21, 23, 25, 27, 29 and 31 produced by differential thermal analysis on various green ferrite bodies at temperatures corresponding to those encountered in the dewaxing step. Each curve is produced by comparing the charteristics of a dewaxed control sample and a group of undewaxed test samples. The test samples all contain the same binder-lubricant and 0 to 8 weight percent of the same exothermic peak suppressor. The control sample is of the same composition as the test samples, except that it has been dewaxed. The control sample and the test samples are heated simultaneously in the same furance with a uniform rate of temperature rise. The temperatures of the dewaxed control sample and of the undewaxed test samples are measured during the heating cycle. The temperature of the control sample is plotted along the ordinate and the temperature differential between the control sample temperature and each test sample is plotted on the abscissa. Where the test sample has a higher temperature than the control sample, the differential temperature is shown as a positive value to the right of the zero value. Where the test sample has a lower temperature than the control sample, the differential temperature is shown as a negative value to the left of the zero value.

The curve 25 was produced with the formulation of Example 1. The differential temperature for this unknown sample is relatively small up to about 450° F., after which the differential temperature increases to a relatively broad low peak 33 at about 510° F. The curve 21 is produced by the same method for a green ferrite body identical in every respect to the green ferrite body of Example 1 except that the vinylidene chloride-acrylate copolymer is omitted. The curve 21 exhibits two relatively sharp high peaks 35 at about 390° F. and 37 at about 50° F. Each of the two peaks 35 and 37 is greater in magnitude than the sole peak 33 on the curve 25. The first peak 35 on the curve 21 indicates a very sharp and high temperature rise and fall in the green ferrite body. This peak is believed to be due to the volatilization and burning or other exothermic reaction of the zinc stearate in the body. The second peak 37 on the curve 25 indicates a somewhat more gradual temperature rise than the first peak 35, but is sharper and higher than peak 33 on the curve 21. This second peak 37 is believed to be due to the volatilization and burning or other exothermic reaction of the wax contained in the body. The sharp rises and falls in temperature in the body represented by the peaks 35 and 37 in the curve 25 are believed to cause strains which produce cracking and shattering in the green ferrite body. By adding the exothermic peak suppresor, as exemplified by the vinylidene chloride-acrylate copolymer, the strains due to the temperature peaks are reduced with a consequent reduction in loss due to cracking and shattering of the green ferrite body.

The curves 21, 23, 25, 27, 29 and 31 illustrate the effect of including varying amounts of an exothermic peak suppressor in the formulation of Example 1. The amounts shown are respectively 0.0, 0.125, 0.5, 1.0, 4.0 and 8.0. In the curves 29 and 31, an exothermic temperature peak 39 appears at about 300° F. This peak 39 is relatively low until the proportion of vinylidene chloride-acrylate is near 8 weight percent.

The exothermic peak suppressor is broadly defined as a material which decomposes before volatilizing at temperatures between about 200° and 500° F. to form gaseous products which do not burn upon contact with air. The evolution of these gaseous products is believed to isolate the body from the air and to prevent burning of the volatiles from the binder-lubricant, at least until they are a safe distance from the body. The most effective materials have been found to be the vinylidene chloride copolymers, particularly vinylidene chloride-acrylate copolymers. One particular vinylidene chloride copolymer which has been found to be effective is marketed by National Starch and Chemical Corp., New York, New York, under the name Resyn 3600. Other copolymers, however, may be used. The exothermic peak suppressor may be added in proportions between about 0.1 and 4.0 weight percent of solids with respect to the total metal oxides content of the green ferrite composition.

With respect to the remaining components of the green ferrite composition, particularly the binder-lubricant system, one may use the known binders and lubricants used for green ferrite bodies usually in proportions of about 0.1 to 8.0 weight percent. See, for example, R. L. Harvey et al., "Ferromagnetic Spinel for Radio Frequencies," RCA Review, XI, 321–363, 1950. The invention is applicable to the methods of preparing other sintered ferrite cores, where the method includes the step of dewaxing in air a green ferrite body which includes a binder-lubricant that volatilizes at temperatures betwen about 200° and 500° F. to form one or more gaseous products which burn upon contact with air. The binder-lubricant materials, typically waxes, starches, glycerine, and metal salts of fatty acids, such as metal stearates, are usually dewaxed in air at temperatures between 200 and 500° F.

The sintered ferrite cores which may be prepared by the method of the invention include sintered crystallites in both the cubic and the hexagonal crystal systems. Some typical ferrites in the cubic crystal system are manganese-zinc ferrite, nickel-zinc ferrite, magnesium-manganese ferrite, and lithium-managanese ferrite. Some typical hexagonal crystal ferrites are barium ferrite, strontium ferrite, and lead ferrite.

*Example 2.*—Follow the procedure of Example 1 except use the following formulation: 71.4 weight percent $Fe_2O_3$, 20.12 weight percent MnO, 8.47 weight percent ZnO, and a binder-lubricant comprising 8 weight percent of an aqueous wax emulsion (containing 50% solids), about 1.0 weight percent glycerine, and 0.5 weight percent starch.

FIGURE 2 illustrates a family of curves 41, 43, 45, 47 and 49 for formulations according to Example 2 containing 0.0, 1.0, 2.0, 4.0 and 8.0 weight percent of Resyn 3600 respectively. The sharp high peak 51 of the curve 41 is suppressed in the other curves. New peaks (such as peak 53 of curve 45) which are broader and lower do not produce the detrimental effect of the sharp high peak 51.

What is claimed is:
1. A method of making a sintered ferrite core comprising mixing a quantity of ferrite-forming metal oxides, about 0.1 to 8.0 weight percent of at least one material selected from the group consisting of waxes, starches, glycerine, and metal stearates, and about 0.1 to 4.0 weight percent of a vinylidene chloride-acrylate copolymer which decomposes before volatilizing at temperatures between 200° and 500° F., said weight percents being with respect to the total metal oxides content, molding said mixture into a green ferrite body, heating said green ferrite body in air at temperatures between about 200° and 500° F. to remove said material and said copolymer, and then sintering said green ferrite body to form said sintered ferrite core.

2. A method of making a sintered ferrite core comprising mixing a quantity of zinc oxide, manganese oxide and iron oxide in proportions to produce said ferrite with 0.1 to 8.0 weight percent of a binder-lubricant consisting essentially of a metal stearate, a starch, and a wax as a water-based emulsion thereof; and 0.1 to 4.0 weight percent of a vinylidene chloride-acrylate copolymer which decomposes before volatilizing at temperatures between 200° and 500° F., as a water-based emulsion thereof; said weight percents being with respect to the total metal oxides content, comminuting said mixture, drying said mixture, molding said comminuted mixture into a green ferrite body, heating said green ferrite body in air at temperatures between about 200° and 500° F. for about one hour to remove said lubricant-binder and said copolymer, and then sintering said green ferrite body to form said sintered ferrite core.

3. A method of making a sintered ferrite core comprising mixing a quantity of zinc oxide, manganese oxide and iron oxide in proportions to produce said ferrite with 0.1 to 8.0 weight percent of a binder-lubricant consisting essentially of a glycerine, a starch as a water-based emulsion thereof, and a wax as a water-based emulsion thereof; and with 0.1 to 4.0 weight percent of a vinylidene chloride-acrylate copolymer which decomposes before volatilizing at temperatures between 200° and 500° F., as a water-based emulsion thereof, said weight percents being with respect to the total metal oxides content, comminuting said mixture, drying said mixture, molding said comminuted mixture into a green ferrite body, heating said green ferrite body in air at temperatures between about 200° and 500° F. for about one hour to remove said lubricant-binder and said copolymer, and then sintering said green ferrite body to form said sintered ferrite core.

4. In a method of making a sintered ferrite core, the steps comprising mixing ferrite-forming metal oxides, about 0.1 to 8.0 weight percent of at least one material selected from the group consisting of waxes, starches, glycerine, and metal stearates, and about 0.1 to 4.0 weight percent of a vinylidene chloride-acrylate copolymer which decomposes before volatilizing at temperatures between 200° and 500° F., molding said mixture into a green ferrite body, and then heating said green ferrite body in air at temperatures between about 200° and 500° F., said weight percents being with respect to the total metal oxides content of said mixture.

5. In a method of making a sintered ferrite core, the steps comprising mixing a quantity of ferrite-forming metal oxides, about 0.1 to 8.0 weight percent of a binder-lubricant including a metal stearate and a wax as a water-based emulsion thereof, and about 0.1 to 4.0 weight percent of a vinylidene chloride-acrylate copolymer which decomposes before volatilizing at temperatures between 200° and 500° F., as a water-based emulsion thereof, drying said mixture, molding said mixture into a green ferrite body, and then heating said green ferrite body in air at temperatures between about 200° and 500° F. for about one hour, said weight percents being with respect to the total metal oxides content of said mixture.

References Cited by the Examiner
UNITED STATES PATENTS

| | | | |
|---|---|---|---|
| 2,656,319 | 10/53 | Berge | 252—62.5 |
| 2,989,415 | 6/61 | Horton et al. | 252—62.5 |

OTHER REFERENCES

Harvey et al.: Ferromagnetic Spinels etc., RCA Review, September 1950, vol. XI, No. 3, pages 344–349.

MAURICE A. BRINDISI, *Primary Examiner.*
JOSEPH R. LIBERMAN, *Examiner.*